March 10, 1931.   B. F. KUHN   1,795,867
SLEEVE JOINT
Filed March 13, 1925   2 Sheets-Sheet 1
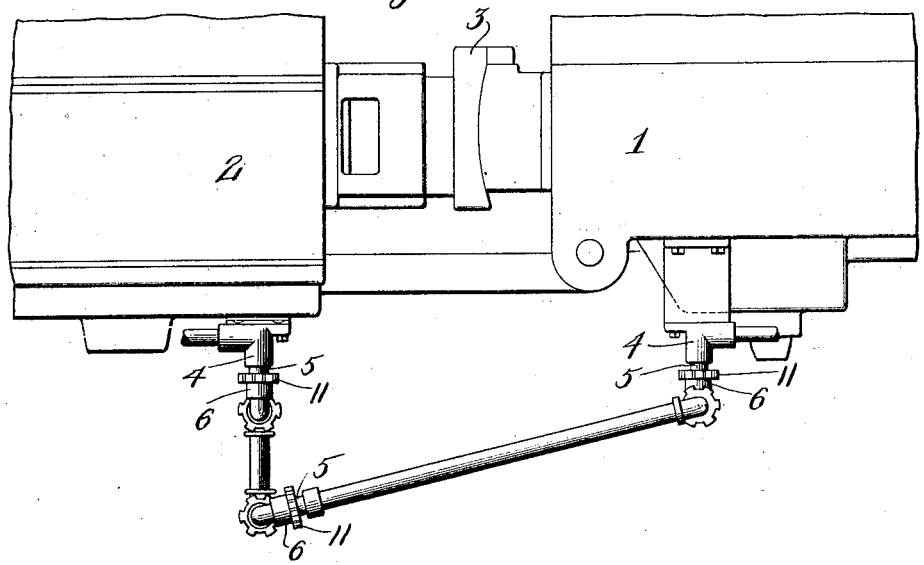
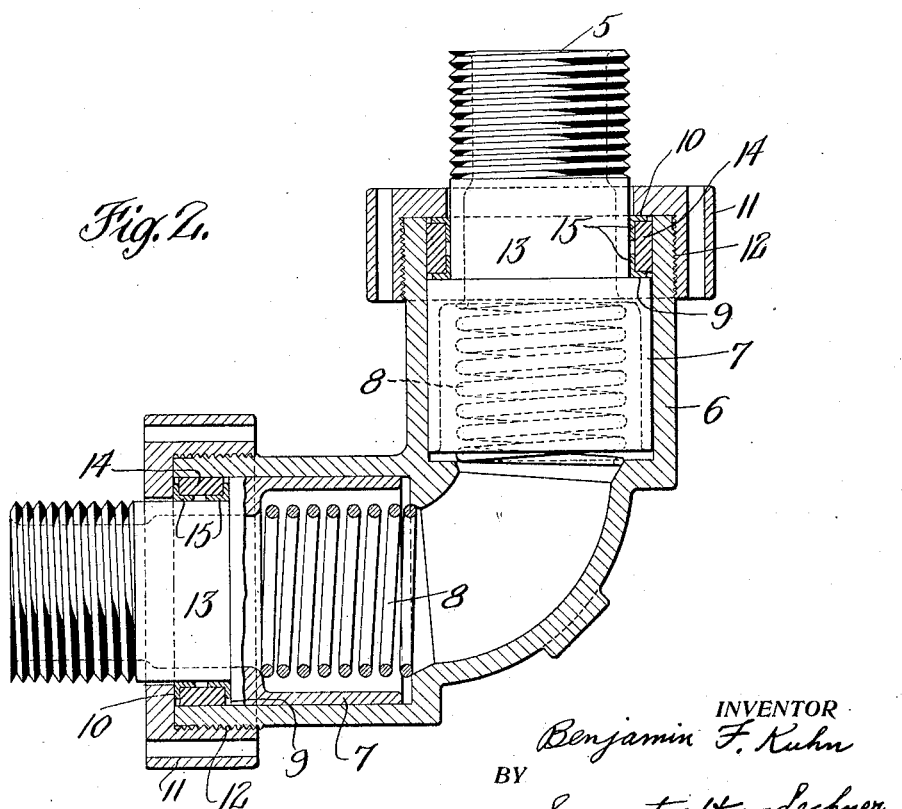
INVENTOR
Benjamin F. Kuhn
BY
Synnestvedt & Lechner
ATTORNEYS March 10, 1931. B. F. KUHN 1,795,867
SLEEVE JOINT
Filed March 13, 1925 2 Sheets-Sheet 2

INVENTOR
Benjamin F. Kuhn
BY
Synnestvedt & Lechner
ATTORNEYS

Patented Mar. 10, 1931

1,795,867

UNITED STATES PATENT OFFICE

BENJAMIN F. KUHN, OF CLEVELAND, OHIO, ASSIGNOR TO FRANKLIN RAILWAY SUPPLY COMPANY, A CORPORATION OF DELAWARE

SLEEVE JOINT

Application filed March 13, 1925. Serial No. 15,200.

This invention has reference to that class of joints which are used for example in steam or air pipe connections on railroad trains or locomotives or other locations where movement is required between two portions of a tubular conduit and where it is important that the joint be tight against leakage while at the same time possessing maximum possible freedom in action.

In joints of this character as heretofore used it has generally been the practice to use either fiber or rubber gasket filling parts which occupy the space in the joint between the sleeve and nut and which are readily compressible by the holding members so as to create pressure that will avoid leakage; but in service, especially under such conditions as are encountered on locomotives or railway cars, the friction incident to making the joint tight is so high that it causes a considerable amount of resistance to the turning movement of the parts. Packing devices entirely of metal will largely overcome the trouble due to friction but are generally difficult to keep perfectly tight.

In order to overcome the difficulties referred to as well as to improve the service of devices of this character in general I provide in my improvement a construction such as I have illustrated in preferred form in the accompanying drawings, wherein—

Fig. 1 is a side elevation showing a connection between a locomotive and tender and a tubular pipe connection between the same.

Fig. 2 is a sectional view thru one of the joints proper showing the arrangement of parts which I employ.

Figure 3:
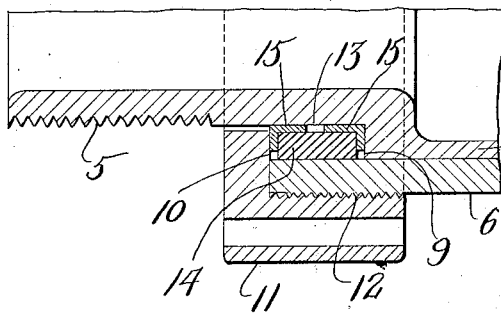
Fig. 3 is a sectional view of a detail on an enlarged scale.

Referring now more particularly to Figs. 1 and 2 it will be seen that I have therein indicated the rear portion of the locomotive frame 1 and the forward portion of a tender frame 2 with the usual arrangement of coupling devices 3 which allow relative motion between the locomotive and tender.

Beneath the locomotive frame 1 I provide a socket casting 4 into the lower opening of which there is screwed a nipple connection 5 as indicated in Fig. 2 from which there is suspended an elbow casing 6 of the arrangement shown having opposite each of its openings a cylindrical chamber in which there is mounted a piston sleeve 7 which is of cup shape and contains a spring 8. The piston 7 has a shoulder at 9 which stands in a position opposite to the inner face 10 of the nut 11 which latter is in threaded engagement at 12 with the casing or body 6.

Between the shank 13 and the inner face of the threaded part 12 of the casing 6 I arrange a composite packing device composed of a rubber or other similar ring 14 and a pair of metal members 15 each of which overlaps respectively one of the side edges of the rubber ring 14.

The metal members 15 may be of any suitable metallic composition such as brass or other preferably non-corrosive compound and provide a fluid-tight bearing on the circumferential surface at 13 which is low in frictional resistance.

Figure 5:
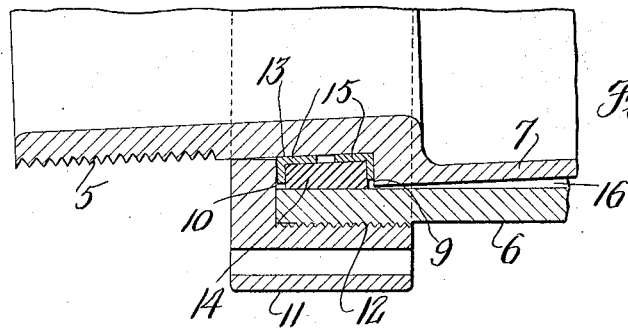
Fig. 5 is a sectional view of a detail showing the accommodation of the parts in my joint to a tilted or distorted position.
Figure 6:
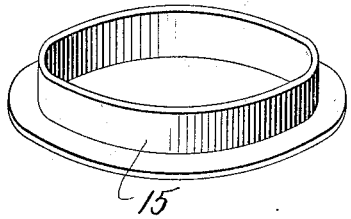
Fig. 6 is a perspective view of one of the metal members which I employ in the joint as it is shown in Fig. 3.

In making this type of joint commercially it is advisable to provide substantial clearance between the body 6 and the end of the sleeve 7 as indicated at 16 in Fig. 5 so that there will be not only ready interchangeability of parts but also free movement of the several parts relative to each other and so that through the clearance referred to the sleeve may rock somewhat in the body, the elasticity of the rubber ring serving to retain close and fluid-tight fit in the chamber between the inner wall of the casing member and the outer wall of the metallic ring in spite of such rocking action as also indicated in Fig. 5.

Such rocking of the parts where a hard gasket only was used would have a tendency to create leakage as it would tend to cause the shoulder at one side to pull away from the packing surface.

It will be evident that by my arrangement we secure the benefits of a soft gasket so far as packing is concerned and the wearing qualities of a very hard gasket.

Figure 4:
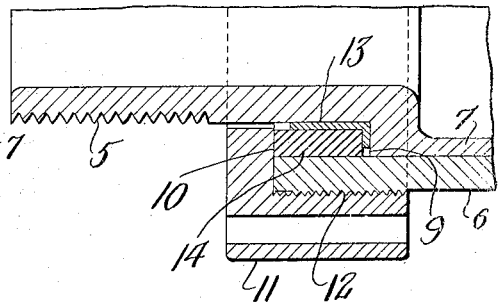
Fig. 4 is a sectional view of a similar detail showing a modification of the structure shown in Fig. 3.
Figure 7:
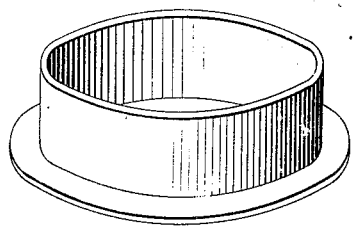
Fig. 7 is a corresponding perspective view of the similar member as used in the structure of Fig. 4.

In Figs. 4 and 7 I have illustrated a modified form of metal part in which only one metal ring is used the extension in this case inside of the sleeve being of greater length however so as to prevent the soft or rubber gasket from coming in contact with the inner sleeve which would cause increase of friction the same as with the older forms in the art.

I claim:—

1. A movable joint comprising, in combination, an outer casing member, an inner sleeve member of slightly smaller diameter rotatably mounted directly in the bore of said casing member and capable of limited rocking movement with respect thereto, an annular shoulder on one of said members forming a packing chamber between them, a metallic packing in contact with said sleeve member, and a resiliently expansible packing between said metallic packing and the outer member, said packing tending at all times to expand and press against said metallic packing and against said outer member regardless of said rocking movement.

2. A movable joint comprising, in combination, an outer casing member, an inner sleeve member of slightly smaller diameter rotatably mounted directly in the bore of said casing member and capable of limited rocking movement with respect thereto, an annular shoulder on one of said members forming a packing chamber between them, a metallic packing ring of fixed dimensions in contact with said sleeve member, and a resiliently expansible packing between said metallic packing and the outer member, said packing tending at all times to expand and press against said metallic packing and against said outer member regardless of said rocking movement.

In testimony whereof, I have hereunto signed my name.

BENJAMIN F. KUHN.